(12) United States Patent
Vachon

(10) Patent No.: US 11,544,365 B2
(45) Date of Patent: Jan. 3, 2023

(54) AUTHENTICATION SYSTEM USING A VISUAL REPRESENTATION OF AN AUTHENTICATION CHALLENGE

(71) Applicant: Bloomberg Finance L.P., New York, NY (US)

(72) Inventor: Philippe Paris Vachon, New York, NY (US)

(73) Assignee: Bloomberg Finance L.P., New York, NY (US)

( * ) Notice: Subject to any disclaimer, the term of this patent is extended or adjusted under 35 U.S.C. 154(b) by 115 days.

(21) Appl. No.: 16/826,889

(22) Filed: Mar. 23, 2020

(65) Prior Publication Data

US 2020/0302043 A1 Sep. 24, 2020

Related U.S. Application Data

(60) Provisional application No. 62/822,280, filed on Mar. 22, 2019.

(51) Int. Cl.
*G06F 21/32* (2013.01)
*G06F 21/36* (2013.01)

(52) U.S. Cl.
CPC .............. *G06F 21/32* (2013.01); *G06F 21/36* (2013.01)

(58) Field of Classification Search
CPC .......... G06F 21/32; G06F 21/36; G06F 21/31; G06F 21/35; H04L 2463/082
See application file for complete search history.

(56) References Cited

U.S. PATENT DOCUMENTS

| 8,203,423 | B2 | 6/2012 | Ozolins | |
|---|---|---|---|---|
| 8,689,294 | B1 * | 4/2014 | Thakur | H04L 63/08 726/4 |
| 8,856,528 | B2 * | 10/2014 | Schrix | H04L 9/3271 713/168 |
| 9,043,605 | B1 * | 5/2015 | Machani | G06F 21/35 713/185 |
| 10,291,575 | B2 * | 5/2019 | Xing | H04L 63/08 |
| 10,325,087 | B1 * | 6/2019 | Goodsitt | G06F 21/42 |
| 10,657,242 | B1 * | 5/2020 | Xia | G06F 21/35 |
| 2005/0044387 | A1 * | 2/2005 | Ozolins | G06F 21/35 713/186 |
| 2013/0179681 | A1 * | 7/2013 | Benson | H04L 9/3234 713/155 |

(Continued)

OTHER PUBLICATIONS

"Galois/Counter Mode," retrieved on Mar. 17, 2020, from Wikipedia, the free encyclopedia, at https://en.wikipedia.org/wiki/Galois/Counter_Mode, 8 pgs.

(Continued)

*Primary Examiner* — Kieu D Vu
*Assistant Examiner* — Rami R Okasha
(74) *Attorney, Agent, or Firm* — Chiesa Shahinian & Giantomasi PC

(57) ABSTRACT

Systems and methods for authenticating a user for accessing a restricted system are provided. A code presented by the restricted system is acquired. The code visually represents an authentication challenge. The authentication challenge is extracted from the code. Authentication information associated with the user for use in the authentication challenge is received. The user is authenticated for accessing the restricted system based on the authentication information.

15 Claims, 3 Drawing Sheets

(56) References Cited

U.S. PATENT DOCUMENTS

| | | | | |
|---|---|---|---|---|
| 2015/0074008 | A1* | 3/2015 | Guillama | G06Q 50/265 |
| | | | | 705/325 |
| 2016/0191520 | A1* | 6/2016 | Voice | H04L 63/104 |
| | | | | 726/7 |
| 2016/0269403 | A1* | 9/2016 | Koutenaei | H04L 63/107 |
| 2016/0294821 | A1* | 10/2016 | Neuman | H04L 63/0884 |
| 2016/0328692 | A1* | 11/2016 | Camps | G06Q 20/204 |
| 2017/0111170 | A1* | 4/2017 | Baghdasaryan | H04L 63/0442 |
| 2017/0118025 | A1* | 4/2017 | Shastri | H04L 63/0861 |
| 2017/0310605 | A1* | 10/2017 | Garcia | H04L 47/822 |
| 2017/0366541 | A1* | 12/2017 | Anand | H04L 63/108 |
| 2018/0097840 | A1* | 4/2018 | Murthy | H04L 63/02 |
| 2019/0028413 | A1* | 1/2019 | Lewis | G06F 16/00 |
| 2019/0228140 | A1* | 7/2019 | Arroyo | G06F 21/32 |
| 2019/0386981 | A1* | 12/2019 | Ramesh Kumar | H04L 63/0853 |
| 2020/0092272 | A1* | 3/2020 | Eisen | G06Q 20/385 |
| 2020/0236113 | A1* | 7/2020 | Monica | H04L 63/0861 |
| 2020/0280855 | A1* | 9/2020 | Avetisov | H04L 63/0823 |

OTHER PUBLICATIONS

"Block Cipher Mode of Operation," retrieved on Mar. 17, 2020, from Wikipedia, the free encyclopedia, at https://en.wikipedia.org/wiki/Block_cipher_mode_of_operation, 17 pgs.

* cited by examiner

AUTHENTICATION SYSTEM USING A VISUAL REPRESENTATION OF AN AUTHENTICATION CHALLENGE

CROSS-REFERENCE TO RELATED APPLICATIONS

This application claims the benefit of U.S. Provisional Application No. 62/822,280, filed Mar. 22, 2019, the disclosure of which is herein incorporated by reference in its entirety.

TECHNICAL FIELD

The present invention relates generally to an authentication system, and more particularly to an authentication system for authenticating a user based on authentication challenges implemented by QR codes.

BACKGROUND

The rapid technological development of computers has resulted in the collection of increasingly large amounts of sensitive and confidential data. Such data is stored, or is otherwise accessible, by computing devices. Traditionally, access to such computing devices has been secured by user authentication requiring a username and password. Recently, two factor and multifactor authentication techniques have been employed to provide enhanced security for accessing computing devices. Such two factor and multifactor authentication techniques typically require an access device to evidence additional user authentication factors. An example of an access device is a mobile device executing an authenticator application displaying a security token to evidence the authentication factor of possession. However, procedures for such two factor and multifactor authentication techniques are typically different when the access device is in an online state or an offline state. Maintaining a number of different procedures for authenticating users is a challenging task.

SUMMARY

In accordance with one or more embodiments, systems and methods for authenticating a user for accessing a restricted system are provided. A code presented by the restricted system is acquired. The code visually represents an authentication challenge and may be a QR (quick response) code, a bar code, or a series of intermittent flashing lights. The authentication challenge is extracted from the code. Authentication information associated with the user for use in the authentication challenge is received. The user is authenticated for accessing the restricted system based on the authentication information.

In one embodiment, an access device acquires the code, extracts the authentication challenge, and receives the authentication information. In one embodiment, the user may be authenticated by displaying a token to the user in response to determining that the access device is offline. The displayed token is input into the restricted system by the user to authenticate the user according to the authentication challenge for accessing the system. In one embodiment, the user may be authenticated by transmitting an indication that the user was authenticated according to the authentication challenge for accessing the restricted system in response to determining that the access device is online.

In one embodiment, the code is acquired in response to the user being authenticated according to an initial authentication challenge. A notification is received in response to the user being authenticated according to the initial authentication challenge. Input from the user interacting with the notification is received and, in response, an authentication application for acquiring the code is automatically opened.

In one embodiment, the authentication challenge is a biometric authentication challenge, and biometric authentication information associated with the user for use in the biometric authentication challenge is received.

These and other advantages of the invention will be apparent to those of ordinary skill in the art by reference to the following detailed description and the accompanying drawings.

DETAILED DESCRIPTION

Embodiments described herein provide for an access device (e.g., a smartphone) to facilitate authentication of a user for access to a restricted system (e.g., a computer terminal). The restricted system authenticates a user for a first authentication challenge (e.g., a username and password authentication challenge) and in response presents a second authentication challenge (e.g., a biometric authentication challenge) implemented via a QR (quick response) code. The restricted system sends an indication of the authentication of the user for the first authentication challenge to an authentication backend system and the authentication backend system sends a push notification to the access device. The user taps the notification to open an authentication application on the access device and the authentication application acquires the QR code using e.g., an image sensor on the access device. The access device receives second authentication information (e.g., biometric information) to authenticate the user for the second authentication challenge. The access device sends an indication of the authentication of the user for the second authentication challenge to the authentication backend system and the authentication backend system sends an indication to the restricted system to grant access to the restricted system to the user. In some embodiments, where the access device is offline, instead of sending the indication of the authentication of the user for the second authentication challenge to the authentication backend system, the access device displays a token and the restricted system receives the token as user input to grant access to the restricted system.

Figure 1:
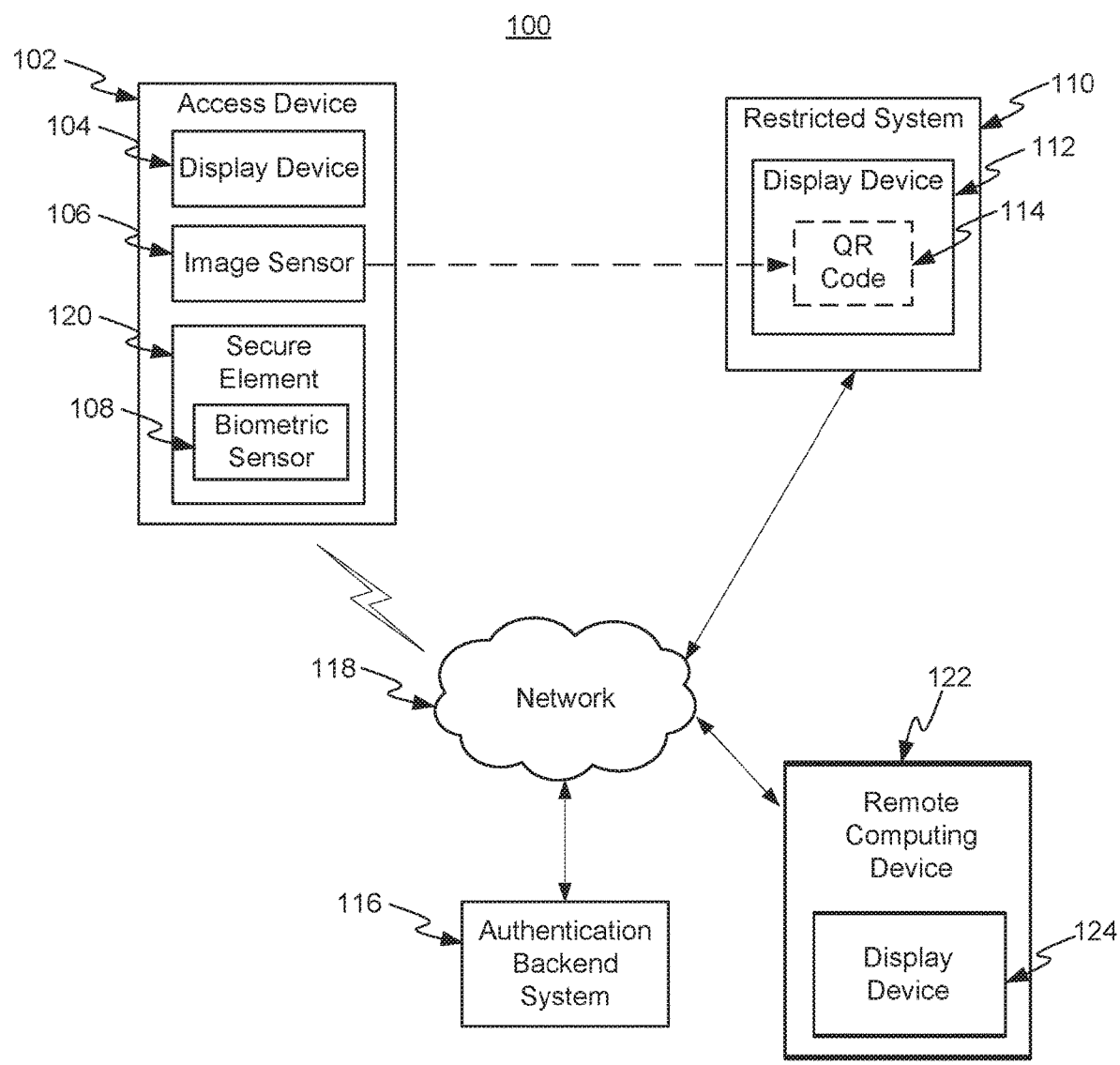
FIG. 1 shows an illustrative communications system, in accordance with one or more embodiments.

FIG. 1 depicts a high level diagram of a communications system 100 for authentication of a user, in accordance with one or more embodiments. Communications system 100 includes a restricted system 110 that a user is attempting to access. In one embodiment, restricted system 110 is a computing device, such as, e.g., a computer, a tablet, a mobile device, or any other type of computing device. However, it should be understood that restricted system 110 may be any type of system that a user is attempting to access, such as, e.g., a website, a user account, a building or physical location, etc. Restricted system 110 includes display device 112. It should be noted that while FIG. 1 depicts QR code 114 displayed on display device 112, in one embodiment, QR code 114 may be displayed on a display device 124 connected to a remote computing device 122 if the user is attempting to access restricted system 110 remotely using remote computing device 122. In such an embodiment, remote computing device 122 may be used to access restricted system 110 when the user is not physically near restricted system 110.

Access device 102 facilitates access to restricted system 110 for the user. Access device 102 may be any device for facilitating access to restricted system 110. In one embodiment, access device 102 is a mobile device such as, e.g., a smartphone, however access device 102 may be any other mobile or non-mobile computing device, such as, e.g., a computer, a tablet, etc. Access device 102 comprises display device 104, image sensor 106 (e.g., camera), secure element 120, and biometric sensor 108. Secure element 120 comprises cryptographic keys and performs cryptographic operations. Biometric sensor 108 performs matching and authentication operations within secure element 120. Biometric sensor 108 may be any type of biometric sensor, such as, e.g., a fingerprint sensor, a facial recognition sensor, an iris or retinal scanner, a voice recognition sensor, etc. In one embodiment, biometric sensor 108 comprises an image sensor (e.g., for facial recognition or iris recognition). Such an image sensor could be image sensor 106 or an additional image sensor as biometric sensor 108.

Restricted system 110 is communicatively coupled to authentication backend system 116 via network 118. Access device 102 and restricted system 110 are shown in FIG. 1 as being communicatively coupled (e.g., wirelessly) to authentication backend system 116 via network 118. However, at times, access device 102 may not be communicatively coupled to authentication backend system 116, such as, e.g., due to an interruption in network service for access device 102, an interruption in the operational status of network 118, an interruption in the operational status of authentication backend system 116, etc. Network 118 may include any type of network or combinations of different types of networks, and may be implemented in a wired and/or a wireless configuration. For example, network 118 may include one or more of the Internet, an intranet, a local area network (LAN), a wide area network (WAN), a cellular communications network, etc. Authentication backend system 116 provides backend support for facilitating authentication of the user for access to restricted system 110 using access device 102. Authentication backend system 116 is described in further detail in the section entitled "Backend Usage Design" below.

The user is authenticated for access to restricted system 110 using access device 102 based on one or more authentication or cryptographic challenges. The authentication challenges are described in further detail in the section entitled "Software Cryptographic Challenges" below. Access device 102 executes an authentication application for performing one or more authentication challenges. The authentication application may be implemented to support various smartphone operating systems, such as, e.g., iOS and Android, as described in further detail in the section entitled "Using the iPhone Secure Enclave for Authentication" and in the section entitled "Using Android Phones for Authentication" below. The flow for authenticating the user for access to restricted system 110 is described in further detail in the section entitled "Login Flows using Smartphone" below. In one embodiment, the user is authenticated for access to restricted system 110 using access device 102 according to method 200 of FIG. 2.

Figure 2:
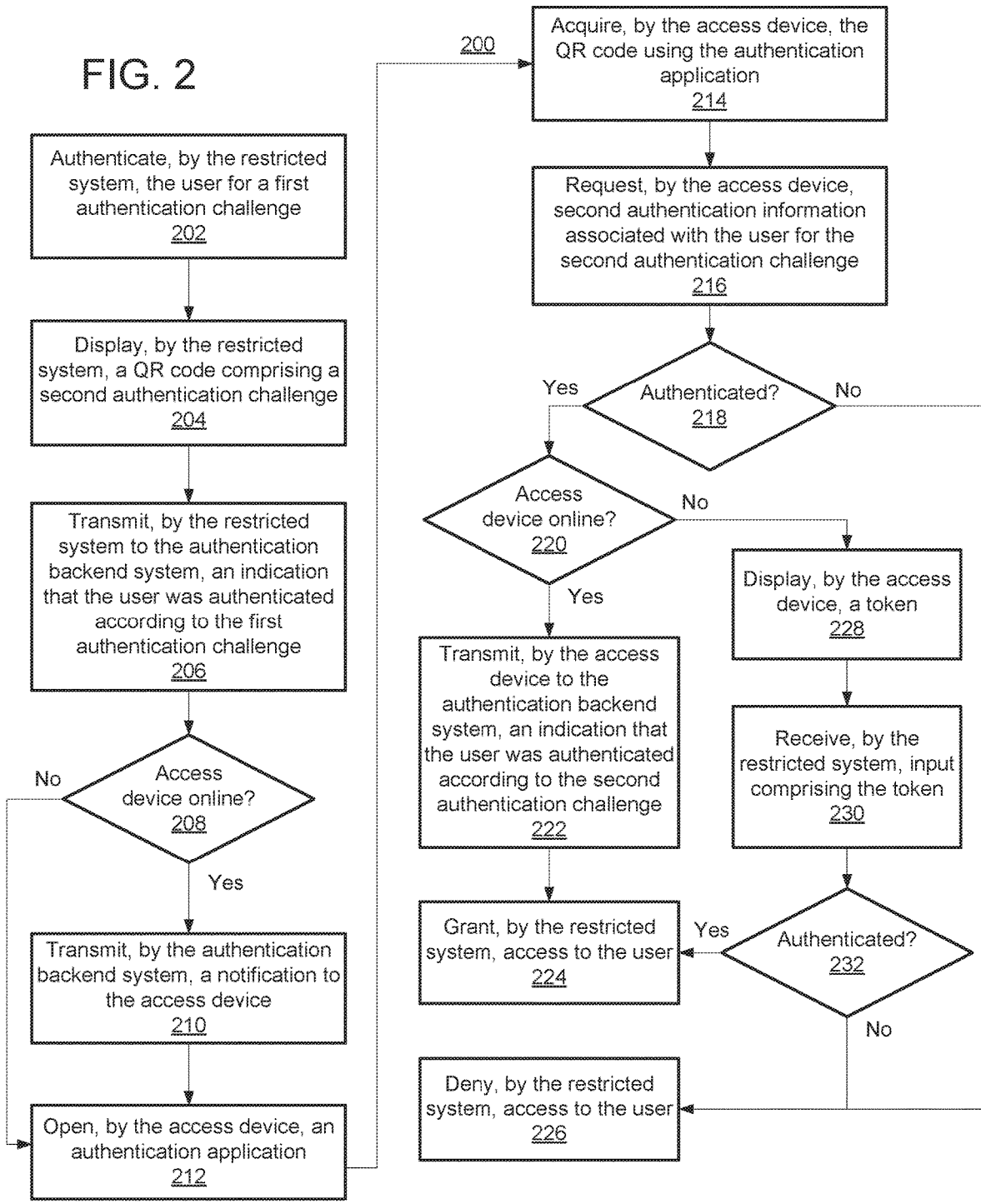
FIG. 2 shows a method for authenticating a user, in accordance with one or more embodiments.

FIG. 2 shows a method 200 for authenticating a user, in accordance with one or more embodiments. FIG. 2 will be described with reference to communications system 100 of FIG. 1. Each of the steps of method 200 will be performed by one of access system 102, restricted system 110, or authentication backend system 116, as indicted below.

At step 202, the user is authenticated by restricted system 110 for a first (or initial) authentication challenge. Restricted system 110 may present the first authentication challenge and in response the restricted system may receive (e.g., from the user) first authentication information from the user. In one embodiment, the first authentication challenge may be presented to the user on a remote computing device (e.g., on a web browser) and the user may provide first authentication information using the remote computing device. In one embodiment, the first authentication challenge is a username and password authentication challenge, and the first authentication information comprises a username and password associated with the user. It should be understood that the first authentication challenge and the first authentication information may be any suitable authentication challenge and any suitable authentication information, respectively.

At step 204, in response to authenticating the user according to the first authentication challenge at step 202, restricted system 110 displays QR code 114 implementing a second authentication challenge on display device 112. QR code 114 is not a component device of communications system 100, but is shown in dashed lines in FIG. 1 to depict QR code 114 displayed on display device 112. In one embodiment, QR code 114 may be displayed on display device 124 connected to remote computing device 122. It should be understood that QR code 114 may be any visual representation of the second authentication challenge and is not limited to a QR code. For example, in some embodiments, QR code 114 may instead be a bar code or a series of intermittent flashing lights.

At step 206, restricted system 110 transmits to authentication backend system 116 an indication that the user was authenticated according to the first authentication challenge.

At step 208, it is determined whether access device 102 is online. It may be determined whether access device 102 is online by access device 102, restricted system 110, or authentication backend system 116. Access device 102 is online when access device 102 can communicate with authentication backend system 116. Access device 102 is offline (i.e., not online) when access device 102 cannot communicate with authentication backend system 116. Examples of when authentication backend system 116 is offline include when access device 102 does not have (e.g., cellular or wifi) service to communicate with network 118, when network 118 is not operational, and when authentication backend system 116 is not operational.

If access device 102 is determined to be online, at step 210, in response to authenticating the user according to the first authentication challenge, authentication backend system 116 transmits a notification (e.g., a push notification) to access device 102. If access device 102 is determined to be not online, method 200 proceeds to step 212.

At step 212, access device 102 opens an authentication application. In one embodiment, where access device is online, access device 102 receives input from the user interacting with (e.g., tapping) the notification and in response access device 102 automatically opens the authentication application. In another embodiment, where access device 102 is not online, access device 102 receives input from the user manually opening the authentication application (without tapping on the notification).

At step 214, access device 102 acquires QR code 114 using the authentication application. Specifically, the user aligns image sensor 106 to QR code 114 (which may be displayed on display device 112, or on display device 124 connected to remote computing device 122) and the authentication application automatically acquires QR code 114. Access device 102 automatically extracts the second authentication challenge. Acquisition of QR code 114 with access device 102 verifies the presence of the user at restricted system 110 or remote computing device 122.

At step 216, access device 102 requests second authentication information associated with the user for the second authentication challenge. In one embodiment, the second authentication challenge is a biometric authentication challenge and the second authentication information is biometric information of the user acquired using biometric sensor 108. Exemplary second authentication information include a finger print information, facial recognition information, iris or retinal information, and voice information. It should be understood that the second authentication challenge and the second authentication information may be any suitable authentication challenge and any suitable authentication information, respectively.

At step 218, it is determined whether the user is authenticated according to the second authentication challenge based on the second authentication information. If the user is determined to be not authenticated according to the second authentication challenge based on the second authentication information (at step 218), at step 226, restricted system 110 denies access to the user. If the user is determined to be authenticated according to the second authentication challenge (at step 218), at step 220 it is determined whether access device 102 is online. In one embodiment, the determination of whether access device 102 is online may be performed a single time at step 206 and the result may be used at both steps 206 and 220.

If access device 102 is determined to be online (at step 220), at step 222 access device 102 transmits to authentication backend system 116 an indication that the user was authenticated according to the second authentication challenge and at step 224 restricted system 110 grants access to the user.

If access device 102 is not determined to be online (at step 220), at step 228 access device 102 displays a token via display device 104 and at step 230 restricted system 110 receives input from the user comprising the token. The token may be a 6 digit token. If the user is determined to be authenticated based on the received token at step 232, then at step 224 restricted system 110 grants access to the user. If the user is determined to be not authenticated based on the received token at step 232, then at step 226 restricted system 110 denies access to the user.

Advantageously, method 200 can authenticate a user for access to restricted system 110 when access device 102 is an online state or an offline state, using the same encryption challenge for both states. In this manner, the encryption is only performed a single time.

Backend Usage Design

This Backend Usage Design section describes how the authentication backend system 116 works in order to support the authentication application executing on access device 102. In particular, this section describes non-user experience (UX)-related details and implementations of the authentication application which support various smartphone operating systems (e.g., iOS, Android).

Push Notification Service:

Push notification services are able to deliver near-real time messages reliably to access device 102 (e.g., mobile phones). Two embodiments of this are Apple APNS (Apple Push Notification Service) and Google Cloud Messaging (GCM).

Authentication backend system 116 triggers a push notification with a specific payload (specified by the service) to be delivered to the user's phone (i.e., access device 102). Push notifications may be used to do one or more of the following:

1. Deliver notification to the user that they're being prompted to authenticate with their authentication application.
2. Deliver a login challenge to the phone, e.g., when access device 102 is offline.
3. Deliver notification that the backend has invalidated their authentication application and prompt for re-enrollment. Various other state updates can be encapsulated this way, as well.

Enrollment Challenge:

When the user has downloaded the authentication application, they may be prompted by the authentication application to start enrollment. This may involve a service provider portal initiating the authentication enrollment process. The user may have a QR code displayed for them, comprising an enrollment one-time use security token. This one-time use security token may comprise an enrollment challenge (e.g., a high-entropy byte string sufficiently sized (e.g., 32 bytes) to prevent an attacker from being able to guess a challenge or from having a challenge reused). This is used to uniquely identify the particular phone enrollment during the process, but also prevent replay of the enrollment attestation.

This one-time use security token is a temporary credential that may be valid for a predetermined amount of time, e.g., 5 minutes that allows the authentication application to continue an enrollment attempt using an appropriate API (application programming interface). Once the enrollment has been successful, the enrollment endpoint may return a failure for the remaining duration that the one-time use security token is valid.

Performing Enrollment:

The authentication application, after decoding the contents of the QR code, may initiate the enrollment process.

Backend Enrollment of the Authentication Application:

During the enrollment process, the authentication backend system 116 may assign the authentication application a unique identifier, which may be either the enrollment challenge or another unique value. This enrollment challenge is a nonce to prevent replay attacks, and uniquely identify the enrollment attempt. Thus, the enrollment challenge, embedded in the one-time use security token, may comprise of one or more of the following:

A challenge nonce (this may also be used as a unique enrollment ID);

Whether or not the user has another legacy or previously enrolled authentication device; and Any additional metadata may be included to provide user experience hints, information to the user about the status of the process, or otherwise.

The access device 102, once it has completed key generation, may send, over a secure channel, one or more of the following information:

The metadata requested as a part of the enrollment challenge;

A cryptographic attestation of the key generated by access device 102; and

The device's push notification identifier.

The enrollment may be verified in the following way:

1. Retrieve the public key from an attestation certificate (e.g., X.509) from the bundle. Verify that the certificate chain is valid, and that the certificate has a valid signature (e.g., from Apple or Google, depending on the device type).
2. Check that the key pair represented in the attestation certificate represents the security requirements set out for this key. The attributes to be validated may include one or more of the following:

Decryption using the private key requires biometric authentication;

Signing using the private key requires biometric authentication;

The key is on NIST curve p256 or is an RSA 2048-bit key;

The key resides in secure authentic hardware (e.g., the Apple SEP (secure enclave processor) or Google-certified TEE (trusted execution environment)); and Attestation challenge nonce matches what was sent by the backend.
3. Verify the signature for the response bundle from the app using the public key contained in the bundle. This public key may now be trusted since it came from the secure authentic hardware.
4. Deactivate existing authentication application enrollments for this user.
5. Update user authentication application record, storing the data below.

Once the authentication application is enrolled, the following data may be stored in the authentication backend system 116:

The unique identifier associated with access device 102;

The attestation certificate;

The public key (e.g., in X9.63 representation for elliptic curve or simple ASN.1 DER representation for RSA keys);

The push notification ID of access device 102; and

The enrollment ID (e.g., the first 16 bytes of the enrollment challenge).

Metadata about the access device 102 (unique IDs, software version, device versions, etc.) may be captured and logged for future analysis.

Lodging in with the Authentication Application:

At login, a user may be prompted with a username/password screen. If the user has an authentication application enrolled, the login process may:

1. Retrieve the authentication application record for the given identifier associated with the access device, including the key record (e.g., in ANSI X9.63);
2. Generate a random integer, and store it in the login state;
3. Encrypt the login challenge, as documented, using the appropriate scheme (e.g., ECIES for iOS, RSA-OAEP (SHA256)-MGF1(SHA1) for Android);
4. ASCII armor the returned binary blob (e.g., using standard base64 encoding);
5. Display a QR-code challenge screen with the ASCII encoded challenge in the QR-code (the ASCII string sent from the authentication backend system 116 may be rendered by the QR code widget);
6. The user may respond with the token code (see next section); and
7. Login may verify this matches the challenge it generated, and allow the user to proceed if it matches.

Token Verification:

The authentication application token code may be, e.g., a 6-digit integer. This integer may be encrypted using the device public key stored in the database.

This data may be encrypted using a scheme appropriate for the target device, based on the key stored in the authentication backend system 116. The device will decrypt this blob and display the token code challenge to the user to enter. The structure of the cryptographic challenge is described in the section entitle "Software Cryptographic Challenges" below.

Online Flow:

The authentication application may send the decrypted challenge to a service that may then forward the result to login. This may be implemented after the offline flow is complete.

Software Cryptographic Challenges

This Software Cryptographic Challenges section describes exemplary embodiments of cryptographic challenges for the offline and online authentication variants using the authentication application.

In one embodiment, where access device 102 is an iPhone, challenges may be encrypted using asymmetric cryptography, such as, e.g., elliptic curve cryptography or RSA.

In another embodiment, where access device 102 is an Android device, challenges may be encrypted by performing an RSA encryption, padding the challenge message with OAEP (optimal asymmetric encryption padding) (using SHA-256), and using MGF1 for mask generation (using SHA-1).

Advanced Encryption Standard (AES):

AES is a standard symmetric block cipher. AES is used with a block cipher mode. Block cipher modes may include, for example:

Electronic Code Book (ECB)—each block is encrypted in a standalone fashion. This is the building block for other block cipher modes;

Chained Block Cipher (CBC)—where the encrypted result of a prior block being encrypted is XORed into the plaintext of the current block;

Counter (CTR)—a nonce is used to seed a stream of encrypted data, that is then XORed with the plaintext; and Galois/Counter Mode (GCM)—similar to CTR, generates a stream of key data, that is XORed with the plaintext block, and each ciphertext block is then multiplied (using a carryless multiply) to generate a "tag" that authenticates the data.

The Challenge Blob:

In one embodiment, the challenge blob may be structured as follows:

4 bytes of token code (challenge), an integer between 000 001 and 999 999;

4 bytes Epoch Timestamp for when the challenge was generated;

1 byte of version; and 7 bytes spare.

This challenge data may be encrypted using a random ephemeral key. This blob may be encrypted using AES-GCM, as described below.

Elliptic Curve Integrated Encryption Standard (ECIES):

ECIES is one exemplary method of generating unique keys for symmetric encryption using a shared secret derived using an ephemeral key (e.g., for iOS devices). This mechanism enables a system holding the public key of a device (pK) to:

1. generate an ephemeral key, retaining the public coordinates of this key (pEK);
2. use pK and pEK to derive a shared secret Z using ECDH; and
3. generate symmetric key sK and symmetric IV sIV to prime an AES-GCM encryption operation, using a Key Derivation Function (KDF).

The service may then transmit the ciphertext and GCM tag, as well as pEK, over an insecure medium.

The recipient of the ciphertext, ephemeral key and GCM tag, in possession of the private key (PK), may then:

1. derive the secret Z from the ephemeral public key and the device's private key;
2. re-derive sK, sIV using the above key derivation function;
3. decrypt the message using AES-GCM; and
4. authenticate the message using the GCM tag.

If AES-GCM is used for all symmetric cryptographic operations, the shared secret may be used to derive both the key and the IV, so these values are unique for each authentication.

ECIES-AES-GCM Blob Structure:

In one embodiment, where access device 102 is an iOS device, ECIES-AES-GCM may be used to encrypt the cryptographic challenge. This blob may be structured as follows:

Ephemeral Key, Public Part:
  1 byte 0×04,
  n-bits X coordinate, and
  n-bits Y coordinate;
Encrypted Challenge Blob, using AES-GCM-128; and
GCM Tag.

The following sections describe the process of generating the shared secret Z, and how the selected KDF (defined below) works. AES-128 (i.e. a 16 byte key) may be used in GCM block mode.

Shared Secret Generation:

Generating the shared secret may be performed using ECDH:
  Generate an ephemeral EC key on the same curve as the key pair from the device.
  Calculate the shared secret Z, using pK, the public key of the device, and the ephemeral EC key's public key points, using ECDH.

In one embodiment, ECDH may be used without cofactors

Key Derivation:

In one embodiment, SHA256 per ANSI X9.63 may be used as the key derivation function (KDF). This involves performing a Diffie-Hellman operation. The encrypting side may use the public key of the recipient to generate this key.

The output of the KDF may then be used as follows:
  AES-GCM key: most significant 16 bytes; and
  AES-GCM IV: least significant 16 bytes.

RSA Challenge Encryption:

In one embodiment, where access device 102 is an Android device, the cryptographic challenge blob may be encrypted using a unique RSA public key provided during enrollment of the device. Before encrypting the challenge blob, the data may be padded using Optimal Asymmetric Encryption Padding (OAEP), using SHA-256.

Encoding the Challenge:

The cryptographic challenge may be encoded as follows:

[Cryptographic Scheme Name]/[Device Enrollment ID]/[Online Authentication By Default]/[base64 Encoded Challenge]

Where:

[Cryptographic Scheme Name] may be ECC in the embodiment where access device 102 is an iPhone and RSA in the embodiment where access device 102 is an Android device.

[Device Enrollment ID] is the unique ID assigned to the device as a part of the enrollment challenge.

[Online Authentication By Default] is a boolean (1 or 0) that indicates whether or not the authentication challenge should be submitted by default to the backend via the backend service, or if the offline mode should be the default.

[base64 Encoded Challenge] is the encrypted challenge (e.g., using ECIES for the iPhone, or RSA-OAEP-SHA256-MGF1-SHA1 for Android)

When this challenge is being rendered as a QR code, the ASCII representation may be directly rendered in the QR code. When the challenge is being transmitted via APNS or FCM, it may be a JSON field in the APNS message.

Using the iPhone Secure Enclave for Authentication

This Using the iPhone Secure Enclave for Authentication section describes how the Secure Enclave Processor (SEP) may be used in embodiments where access device 102 is an iPhone.

More recent generations of iPhones have a Secure Enclave Processor (SEP). A unique, per-device key is generated in the factory based on a secret device serial number and entropy generated by the device. During manufacturing, a certificate is generated based on this key pair, establishing a root of trust for all keys generated by this SEP. This allows a SEP to prove that a key was generated within its trusted environment.

The SEP will store an enrollment key pair, generated upon request. This enrollment key pair may be attached to a user's biometric identity.

It follows that the public key is shared with the outside world. This public key can be used to verify signatures generated by the private key and encrypt data that can only be decrypted using the private key.

This key can be used in the iOS environment like any other key in the Keychain. However, the private key cannot be exported from the SEP's environment.

In order to verify a key pair was generated in a real iPhone SEP, the generated key is attested. This attestation may be verified by the backend, using an X.509 certificate for the key (containing a challenge) that may be generated by an attestation service.

Starting Enrollment:

The login process checks the authentication application's enrollment status. If the authentication application is not enrolled, the user may be prompted to download the authentication application. Once the user has indicated they have downloaded the authentication application, the user may be prompted with a QR code comprising the enrollment challenge.

This QR code may comprise a one-time use security token that may be used to authenticate with the enrollment service.

The QR code may comprise a URI for a custom URI scheme handler for the authentication application. The custom URI may contain a one-time use security token that may be used to communicate with the enrollment service. The custom URI scheme may force the authentication application to start, and kick-off the enrollment key generation process. The one-time use security token may then be used to authenticate to the backend to "enroll" the new authentication application.

In summary:
1. User logs in;
2. User "Enrolls" an authentication application;
3. A QR code that contains the one-time use security token used to authenticate that enrollment is displayed;
4. The one-time use security token is used to authenticate to a system; and
5. Authentication application starts the enrollment process.

The Enrollment Challenge from the Backend:

The Enrollment one-time use security token may comprise a challenge to the authentication application for verifying the enrollment attestation. This challenge is a nonce that may be used to verify the key being generated is not being replayed.

Key Attestation at Enrollment:

Key Attestation is the process by which a certificate is used to verify a key was generated within a particular environment. In the embodiment of the SEP, this is accomplished by the unique, per-device key that is signed in the factory. To ensure the enrollment is unique (i.e. to prevent replay attacks), the authentication backend system 116 may provide a nonce (e.g., 32 bytes of entropy) that is to be signed during attestation.

When a key pair is generated in the secure enclave, the public key of that key pair may be extracted in the process. Where access device 102 is an untampered (i.e. non-jailbroken or uncompromised) iPhone, this may be sufficient on its own. However, an attestation step may be needed to prove a key was actually generated and stored in the SEP.

The attestation data may contain ASN.1 attestation information (signature from the attestation key). This information, along with the public key, may be sent to the backend for validation.

There is an intervening step where an X.509 certificate may be generated, using a service called the Anonymous Attestation Authority (AAA).

The authentication backend system 116 may receive the enrollment response from the authentication application. The backend enrollment service may then verify that the public key matches the certificate, validate that the attestation certificate parameters match expected values (i.e. the key policies are correct for biometric authentication) and that the signature on the certificate is valid, and that the attestation challenge signature can be verified using the public key. Once these actions are complete, the enrollment record may be written out, including:

1. The user's ID (e.g., unique identifier);
2. A paper trail (e.g., epoch timestamp of enrollment, any other data relevant to record); and
3. The public key for this user.

Subsequent login attempts may retrieve this record to generate the challenge the device is to respond to.

Key attestation may only need to be performed during enrollment. Once the key has been attested, it may be used for decrypting regular challenges at login.

The authentication backend system 116 may occasionally request that the key is re-attested during online logins.

Authenticating using the iPhone Authentication Application:

Establishing Presence:

In embodiments where access device 102 is an iPhone, a QR code may be used for presence detection. Alternative mechanisms that are resilient to dropped frames and using spatial encoding may also be used.

Offline Authentication Flow:

The authentication backend system 116 may generate a challenge, which represents a token code the user will type in. This token code may be encrypted using Elliptic Curve Integrated Encryption Scheme (ECIES) with the public key that the backend recorded during enrollment. The encrypted data (ephemeral ECIES key, AES-GCM tag, ciphertext) may then be encoded and represented as a QR-code. The QR-code may be acquired using the authentication application.

The private key that is managed by the Secure Enclave may be used to decrypt the message. The user may be prompted for biometric authentication to unlock the key at this stage.

The user may then enter the decrypted string, and the backend may compare the string and the nonce generated and stored in the encrypted challenge. If these match, the user may be allowed to proceed.

Online Authentication Flow:

When the user's phone has a working cellular and Internet connection, transmitting a response may be done without the user having to enter data.

After enrollment, authentication may be performed by authentication backend system 116 transmitting a nonce. The nonce (plus other metadata that can be gathered from the phone's environment) may be signed using the private key in the SEP. The metadata blob, the nonce and the signature may be transmitted to the backend. The user may be prompted for biometric authentication when the signing attempt is made with the key, transparent to the authentication application.

This information may then be validated by the authentication backend system 116 during a login attempt. In one embodiment, a push notification, such as, e.g., an Apple Push Notification Service (APNS) notification, may be sent to the authentication application at login time to make the authentication application easily accessible from the user's home screen.

Using APNS may also improve mobile login flow, since an APNS notification from the backend would allow the user to switch to the authentication application, then transparently perform the authentication and hand back to the Mobile app.

Using a QR code advantageously allows sending the whole challenge from the backend, thus allowing for the authentication application to be used offline.

Policy:
1. In one embodiment, multiple keys may be generated at enrollment time, depending on the permissioning of the user. For example, a typical user may have one key, but different keys may be generated based on the authorization of the user (i.e. for dev/toolkit access, production access, etc.).

Using Android Phones for Authentication

This Using Android Phones for Authentication section describes how the Android Trusted Execution Environment and Hardware backed keystore (keymaster) may be used in embodiments where access device 102 is an Android device.

More recent versions of the Android operating system support key attestation for keys that reside in the purview of the Hardware Backed Keystore (interfaced with the Keymaster API). Many of the concepts described in the section Using the iPhone Secure Enclave for Authentication are also applicable to Android, so it follows that this section provides a description of the technical details to implement Android-based credential storage.

Starting Enrollment:

The login process may check the authentication application's enrollment status.

The Enrollment Challenge from the Backend:

The Enrollment one-time use security token may comprise a challenge to the Android authentication application for verifying the enrollment attestation. This challenge may be a nonce that will be used to verify the key being generated is not being replayed.

Generating the Key at Enrollment:

A RSA key may be generated in the Android Keystore.

Key Attestation at Enrollment:

To perform key attestation, the certificates for the key are extracted. This may be done using the key store. After generating the key, the KeyStore object for the Android KeyStore may be used to retrieve the attestation certificate chain directly, resulting in an array of certificates.

This array of certificates comprises the complete trust chain, starting from Google's root certificate. This certificate chain may be encoded as multiple X.509 certificates to be passed to the backend for validation. The device's public key may then be extracted from the X.509 attestation certificate for further processing.

When the backend receives the certificates, the following may be done by the backend:
 1. Validate the certificate chain, checking the signatures of each certificate in the chain against a (pinned) Google root certificate;
 2. Validate that none of the certificates (including the new attestation certificate) have expired; and
 3. Check that none of the intermediate certificates have been revoked.

Authenticating using the Android authentication application:

Establishing Presence:

A QR code for presence detection may be used. Alternative mechanisms that are resilient to dropped frames and use spatial encoding may also be used.

Offline Authentication Flow:

The authentication challenge may be encrypted using the RSA public key transferred during enrollment. The authentication challenge may be padded using OAEP, with SHA-256 as the message digest. A sample challenge may be generated using OpenSSL. The output contains a 256 byte encrypted blob that may be passed to the device for decryption.

Online Authentication Flow:

The backend may transmit, via a trusted mechanism, a, e.g., 32 byte nonce. This 32 byte nonce may be signed using the Android authentication application key, and the signature may be transmitted back to the backend service.

Using a QR code advantageously allows use of a longer and more detailed challenge. The QR code can be used to send the whole challenge from the backend, thus allowing for the authentication application to be used offline.

Login Flows using Smartphone

This Login Flows using Smartphone section describes how users may log in using the authentication application.

Offline Flow:

The offline flow does not require networked communication between the access device 102 and the authentication backend system 116 during user login.

All use cases may be able to degrade to the offline flow. This ensures that a user, even if remote in a location without connectivity for their cell phone is able to login to the restricted system.

Steps:
 1. [On the restricted system or on a remote computing device] User enters username and password
 2. [On the restricted system or on a remote computing device] QR code containing login challenge is displayed
 3. [On access device] User opens authentication application
 4. [On access device] User aligns camera with the displayed QR code, authentication application acquires the QR code automatically
 5. [On access device] User is prompted for biometric authentication (or any other form of authentication)
 6. [On access device] On successful authentication, user has a login token code displayed
 7. [On the restricted system or on a remote computing device] User enters token code
 8. Stop. User is logged in to restricted system 110 either directly or remotely via remote computing device.

Offline Flow with Push Notification:

The Offline Flow may be augmented by a push notification. This notification may be sent without requiring the access device to 102 be online.

The push notification adds an additional step to the login process. The authentication backend system 116 may send a push notification as soon as the user successfully enters their username and password. This may streamline opening the authentication application—by tapping on the push notification, the user is able to open the authentication application to scan the QR code.

Steps:
 1. [On the restricted system or on a remote computing device] User enters username and password
 2. [On Backend] A push notification is sent to user's phone with a prompt to log in to the service
 3. [On the restricted system or on a remote computing device] QR code containing login challenge is displayed
 4. [On access device] User opens authentication application by tapping push notification or opening the authentication application manually.
 5. [On access device] User aligns camera with the displayed QR code, the authentication application acquires the QR code automatically
 6. [On access device] User is prompted for biometric authentication (or any other form of authentication)
 7. [On access device] On successful authentication, a login token code displayed
 8. [On the restricted system or on a remote computing device] User enters token code
 9. Stop. User is logged in to restricted system 110 either directly or remotely via remote computing device.

Token Mode Authentication:

Token mode authentication may be performed when the user needs to access a service that does not require a proof of physical presence (i.e. QR code). This flow may use a push notification to streamline its use, but may fall back to a QR code driven mechanism when the user is offline or has poor connectivity.

Online Steps:
1. [On Application] User enters credentials
2. [On Backend] A push notification is sent to access device 102, with a prompt to log into the specified service, with an encoded authentication challenge.
3. [On access device] User receives push notification, taps notification.
4. [On access device] User is prompted by the authentication application to authenticate with biometric authentication (or any other form of authentication)
5. [On access device] On successful authentication, user has a login token code displayed
6. [On Application] User enters token code, continues their login process
7. Stop. User is logged into service.

However, because it's possible that the user might not be online to receive the push notification, a workflow where a user can use a QR code to transmit the challenge may be used.

Offline Token Mode Path Steps:
1. [On Application] User enters credentials
2. [On Backend] A push notification is sent to access device 102, with a prompt to log into the specified service, with an encoded authentication challenge. User does not receive this message.
3. [On Application] User clicks a "I did not receive a notification" link on the application login page (or any other indication that the user did not receive the notification).
4. [On Application] Application displays a QR code comprising information that was transmitted in the push notification in step 2.
5. [On access device] User opens the authentication application.
6. [On access device] User aims the camera at the QR code, and the authentication application acquires the QR code and authenticates with it.
7. [On access device] User is prompted by authentication application to authenticate with biometric authentication (or any other form of authentication)
8. [On access device] On successful authentication, user has a login token code displayed
9. [On Application] User enters token code, continues their login process
10. Stop. User is logged into service.

Offline Flow with URI Handler:
This flow may be used if a user is trying to authenticate to a service using the same device as the device on which the authentication application is installed.
Steps:
1. [On Application, on access device] User enters username/password
2. [On Application, on access device] Application identifies if the URI scheme handler is registered, and that the authentication application app can be invoked. If the handler is not installed, switch to the normal offline flow.
3. [On Backend] Backend generates unique challenge URI
4. [On Application, on access device] Application receives challenge URI, and invokes the custom scheme handler.
5. [On access device, with authentication application] User authenticates with authentication application, as normal (but does not have to scan the QR code).
6. [On access device, with authentication application] Authentication application displays token code, and provides a means for the user to copy the code to the clipboard.
7. [On Application, on access device] User switches (or is switched) back to the original app, and pastes the token code.
8. Stop. The user is logged into service.

Online Flow:
This flow involves eliminating the user entering the token manually. This flow may optionally have a presence challenge (QR code).
Steps:
1. [On the restricted system or on a remote computing device] User enters username and password
2. [On Backend] A notification is sent to access device 102 with a prompt to log in to the service, optionally containing the authentication challenge.
3. [On the restricted system or on a remote computing device] QR code containing login challenge is displayed (optional)
4. [On access device] User opens authentication application by tapping notification (alternatively, the user may manually open the authentication application and still receive the challenge and process it).
5. [On access device] (optional, if presence challenge is required) User aligns camera with the displayed QR code, authentication application acquires the QR code automatically
6. [On access device] User is prompted for biometric authentication (or any other form of authentication)
7. [On access device] After successful authentication, authentication application signs the challenge using the secret key, and transmits the signed challenge to the backend.
8. [On the restricted system or on a remote computing device] User sees that the challenge was received and accepted, and the user is automatically logged in to the restricted system 110.
9. Stop. User is logged in to restricted system 110.

The online flow is able to fall back to the offline authentication mode from here. This may be where the user indicates that the user did not receive the notification and can manually scan a QR code.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIG. 2. Certain steps or functions of the methods and workflows described herein, including one or more of the steps or functions of FIG. 2, may be performed by a server or by another processor in a network-based cloud-computing system. Certain steps or functions of the methods and workflows described herein, including one or more of the steps of FIG. 2, may be performed by a client computer in a network-based cloud computing system. The steps or functions of the methods and workflows described herein, including one or more of the steps of FIG. 2, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIG. 2, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

A high-level block diagram of an example computer 302 that may be used to implement systems, apparatus, and methods described herein is depicted in FIG. 2. Computer 302 includes a processor 304 operatively coupled to a data storage device 312 and a memory 310. Processor 304 controls the overall operation of computer 302 by executing computer program instructions that define such operations. The computer program instructions may be stored in data storage device 312, or other computer readable medium, and loaded into memory 310 when execution of the computer program instructions is desired. Thus, the method and workflow steps or functions of FIG. 2 can be defined by the computer program instructions stored in memory 310 and/or data storage device 312 and controlled by processor 304 executing the computer program instructions. For example, the computer program instructions can be implemented as computer executable code programmed by one skilled in the art to perform the method and workflow steps or functions of FIG. 2. Accordingly, by executing the computer program instructions, the processor 304 executes the method and workflow steps or functions of FIG. 2. Computer 304 may also include one or more network interfaces 306 for communicating with other devices via a network. Computer 302 may also include one or more input/output devices 308 that enable user interaction with computer 302 (e.g., display, keyboard, mouse, speakers, buttons, etc.).

Processor 304 may include both general and special purpose microprocessors, and may be the sole processor or one of multiple processors of computer 302. Processor 304 may include one or more central processing units (CPUs), for example. Processor 304, data storage device 312, and/or memory 310 may include, be supplemented by, or incorporated in, one or more application-specific integrated circuits (ASICs) and/or one or more field programmable gate arrays (FPGAs).

Data storage device 312 and memory 310 each include a tangible non-transitory computer readable storage medium. Data storage device 312, and memory 310, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 308 may include peripherals, such as a printer, scanner, display screen, etc. For example, input/output devices 308 may include a display device such as a cathode ray tube (CRT) or liquid crystal display (LCD) monitor for displaying information to the user, a keyboard, and a pointing device such as a mouse or a trackball by which the user can provide input to computer 302.

Any or all of the systems and apparatus discussed herein, including access device 102, restricted system 110, authentication backend system 116, and remote computing device 122 of FIG. 1, may be implemented using one or more computers such as computer 302.

Figure 3:
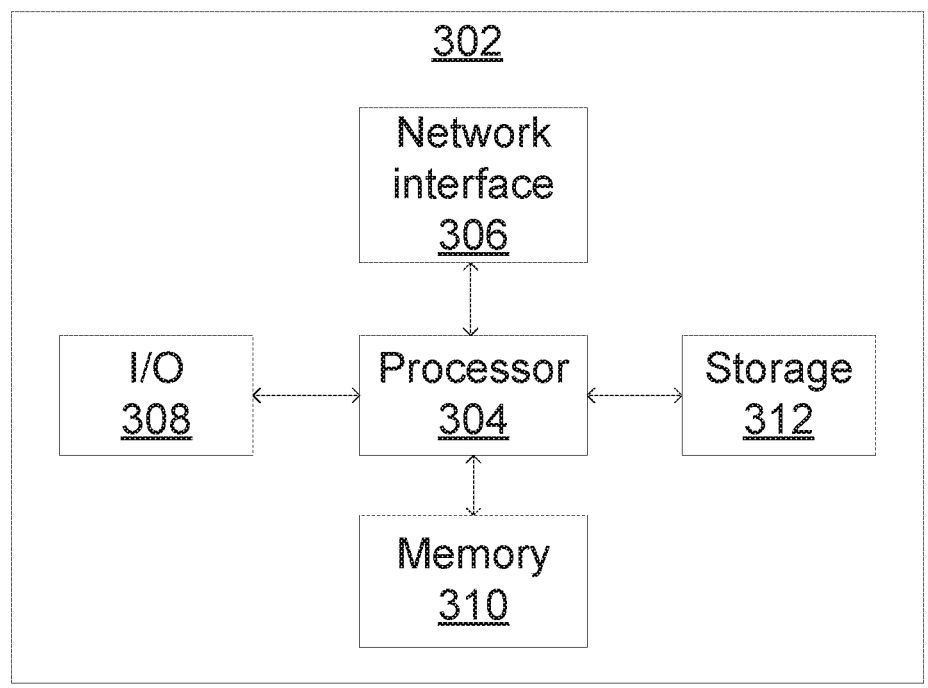
FIG. 3 shows a high-level block diagram of a computer.

One skilled in the art will recognize that an implementation of an actual computer or computer system may have other structures and may contain other components as well, and that FIG. 3 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for authenticating a user for accessing a restricted system by an access device, comprising:
   in response to the user being authenticated according to a first authentication challenge, receiving a notification prompting the user to open an authentication application for authenticating the user according to a second authentication challenge;

automatically opening the authentication application in response to receiving input from the user interacting with the notification;

acquiring a code presented by the restricted system using the authentication application, the code presented in response to the user being authenticated according to the first authentication challenge and visually representing the second authentication challenge;

extracting the second authentication challenge from the code;

receiving authentication information associated with the user for use in the second authentication challenge;

in response to determining that the access device is in an offline state, displaying a token to the user, wherein the user is authenticated according to the second authentication challenge for accessing the restricted system in response to the displayed token being input into the restricted system; and in response to determining that the access device is in an online state, transmitting an indication that the user was authenticated according to the same second authentication challenge for accessing the restricted system.

2. The method of claim 1, wherein the code comprises a QR (quick response) code.

3. The method of claim 1, wherein the code comprises a bar code.

4. The method of claim 1, wherein the code comprises a series of intermittent flashing lights.

5. The method of claim 1, wherein the second authentication challenge is a biometric authentication challenge, and receiving authentication information associated with the user for use in the second authentication challenge comprises:

receiving biometric authentication information associated with the user for the biometric authentication challenge.

6. The method of claim 1, wherein the first authentication challenge comprises a username and a password.

7. An access device for authenticating a user for accessing a restricted system, comprising:

an image sensor for acquiring a code presented by the restricted system using an authentication application, the code presented in response to the user being authenticated according to a first authentication challenge and the code visually representing a second authentication challenge;

a processor; and a memory to store computer program instructions, the computer program instructions when executed on the processor cause the processor to perform operations comprising:

in response to the user being authenticated according to the first authentication challenge, receiving a notification prompting the user to open the authentication application for authenticating the user according to the second authentication challenge;

automatically opening the authentication application in response to receiving input from the user interacting with the notification;

extracting the second authentication challenge from the code;

receiving authentication information associated with the user for use in the second authentication challenge;

in response to determining that the access device is in an offline state, displaying a token to the user, wherein the user is authenticated according to the second authentication challenge for accessing the restricted system in response to the displayed token being input into the restricted system; and in response to determining that the access device is in an online state, transmitting an indication that the user was authenticated according to the same second authentication challenge for accessing the restricted system.

8. The access device of claim 7, wherein the code comprises a QR (quick response) code.

9. The access device of claim 7, wherein the code comprises a bar code.

10. A non-transitory computer readable medium storing computer program instructions for authenticating a user for accessing a restricted system by an access device, the computer program instructions when executed by a processor cause the processor to perform operations comprising:

in response to the user being authenticated according to a first authentication challenge, receiving a notification prompting the user to open an authentication application for authenticating the user according to a second authentication challenge;

automatically opening the authentication application in response to receiving input from the user interacting with the notification;

acquiring a code presented by the restricted system using the authentication application, the code presented in response to the user being authenticated according to the first authentication challenge and visually representing the second authentication challenge;

extracting the second authentication challenge from the code;

receiving authentication information associated with the user for use in the second authentication challenge;

in response to determining that the access device is in an offline state, displaying a token to the user, wherein the user is authenticated according to the second authentication challenge for accessing the restricted system in response to the displayed token being input into the restricted system; and in response to determining that the access device is in an online state, transmitting an indication that the user was authenticated according to the same second authentication challenge for accessing the restricted system.

11. The non-transitory computer readable medium of claim 10, wherein the code comprises a QR (quick response) code.

12. The non-transitory computer readable medium of claim 10, wherein the code comprises a series of intermittent flashing lights.

13. The non-transitory computer readable medium of claim 10, wherein the second authentication challenge is a biometric authentication challenge, and receiving authentication information associated with the user for use in the second authentication challenge comprises:

receiving biometric authentication information associated with the user for use in the biometric authentication challenge.

14. The non-transitory computer readable medium of claim 10, wherein the first authentication challenge comprises a username and a password.

15. An authentication system, comprising:

a restricted system for presenting a code visually representing a second authentication challenge in response to a user being authenticated according to a first authentication challenge;

an access device for:

in response to the user being authenticated according to the first authentication challenge, receiving a notification prompting the user to open an authentication application for authenticating the user according to the second authentication challenge;

automatically opening the authentication application in response to receiving input from the user interacting with the notification;

acquiring the code presented by the restricted system using the authentication application;

extracting the second authentication challenge from the code;

receiving authentication information associated with the user for use in the second authentication challenge;

in response to determining that the access device is in an offline state, displaying a token to the user, wherein the user is authenticated according to the second authentication challenge for accessing the restricted system in response to the displayed token being input into the restricted system; and in response to determining that the access device is in an online state, transmitting an indication that the user was authenticated according to the same second authentication challenge for accessing the restricted system.

* * * * *